United States Patent [19]

Izawa et al.

[11] Patent Number: 5,028,995
[45] Date of Patent: Jul. 2, 1991

[54] PICTURE SIGNAL PROCESSOR, PICTURE SIGNAL CODER AND PICTURE SIGNAL INTERPOLATOR

[75] Inventors: Yuuji Izawa, Hachioji; Junichi Kimura, Kokubunji; Masaaki Takizawa, Koganei, all of Japan

[73] Assignee: Hitachi, Ltd., Tokyo, Japan

[21] Appl. No.: 259,519

[22] Filed: Oct. 18, 1988

[30] Foreign Application Priority Data

Oct. 28, 1987 [JP] Japan .................... 62-270186
Mar. 25, 1988 [JP] Japan .................... 63-69366

[51] Int. Cl.⁵ .................... H04N 7/18; H04N 7/12
[52] U.S. Cl. .................... 358/105; 358/135; 358/136; 375/27
[58] Field of Search ............. 358/105, 133, 135, 136; 375/27

[56] References Cited

U.S. PATENT DOCUMENTS

| | | | |
|---|---|---|---|
| 3,984,626 | 10/1976 | Mounts et al. | 358/135 |
| 4,541,012 | 9/1985 | Tescher | 358/135 |
| 4,672,441 | 6/1987 | Hoelzlwimmer et al. | 358/135 |
| 4,689,671 | 8/1987 | Ohki et al. | 358/135 |
| 4,698,672 | 10/1987 | Chen et al. | 358/136 |
| 4,723,161 | 2/1988 | Koga | 358/135 |
| 4,757,383 | 7/1988 | Tanaka | 358/135 |
| 4,816,906 | 3/1989 | Kummerfeldt et al. | 358/135 |
| 4,821,119 | 4/1989 | Gharavi | 375/27 |
| 4,833,535 | 5/1989 | Ozeki et al. | 358/136 |

Primary Examiner—John K. Peng
Attorney, Agent, or Firm—Antonelli, Terry, Stout & Kraus

[57] ABSTRACT

An image signal processor in which the conversion process of a picture signal is performed in block unit, not in frame unit, and in order to raise the speed of the process, besides an orthogonal transform matrix, the products between the orthogonal transform matrix and matrices for realizing picture resolution conversion, image manipulation processes such as expansion, compression and rotation, and various kinds of linear filtering are provided in a coefficient memory as new transform matrices, and these transform matrices are properly changed-over in accordance with the content of the pertinent transform, thereby to perform an orthogonal transform or an inverse orthogonal transform.

6 Claims, 5 Drawing Sheets

PICTURE SIGNAL PROCESSOR, PICTURE SIGNAL CODER AND PICTURE SIGNAL INTERPOLATOR

BACKGROUND OF THE INVENTION

1. Field of the Invention

The present invention relates to a picture signal processor in which a picture signal (still picture, motion picture) is coded in order to transmit or file it with high efficiency or in which a picture signal spatially sampled is converted into a picture of different resolution.

2. Description of the Related Art

Heretofore, apparatuses for coding picture signals have been used for transmitting or filing the picture signals.

One coding system which is very excellent in terms of coding efficiency and the picture quality is a block coding system which adopts an orthogonal transform.

This system utilizes the fact that, when a signal within a block has been transformed into two-dimensional frequency components, electric power concentrates near a component of low order (for example, a D.C. term corresponding to a mean value). As for the methods of performing the transform, there are the DCT (Discrete Cosine Transform), etc. (refer to, for example, N. Ahmed, et al; "Discrete Cosine Transform", IEEE Trans. Comput., vol. C-23, 1974-1).

A still picture filing apparatus or motion picture transmitting apparatus employing the orthogonal transform has had problems as stated below:

For example, picture resolution conversion including the format change between NTSC and PAL or such an image manipulation process as expansion, compression or rotation has been generally performed in picture-frame unit.

More specifically, the impulse response of an interpolation filter corresponding to the picture conversion is found, and the convolution between the impulse response and an input picture signal is taken. Since, however, this processing method results in a two-dimensional convolution, it has a large amount of processing operations and is realized for the first time by a high-speed processing circuit configured of, for example multiplier units, in large numbers.

Moreover, it is difficult to share a frame memory for storing an original picture and a picture as the processed result thereof, and a frame memory for the interpolation process needs to be separately added. This has led to the disadvantage that the circuit scale for the processing method increases.

An interpolation circuit for the prior-art picture signal processing has often adopted a method wherein a two-dimensional picture signal is multiplied by two-dimensional operators so as to accumulate the products (a method based on the so-called two-dimensional convolution).

This interpolation method is small in the amount of calculations and has been effective as a general interpolation method in the following case:

(1) in a case where the two-dimensional operators are in a comparatively small number, for example, 3×3, or (2) in a case where the relationship between the position of a pixel to be obtained by the interpolation and the positions of the pixels of the original picture is regular (for example, a case where the former pixel lies at the middle point of the latter pixels).

The method, however, has had the disadvantages of an increase in the amount of calculations and enlargement in the circuit scale in the following cases:

(1) in a case where the two-dimensional operators become large in number, for example, where a block average is smoothed and then displayed in the progressive coding of a picture, or (2) in a case where the pixel to be obtained by the interpolation and the pixels of the original picture are not in a simple positional relationship such as the middle point, as in the conversion between PAL and NTSC signals.

SUMMARY OF THE INVENTION

The first object of the present invention is to provide a picture signal coder which realizes the picture resolution and the conversion image manipulation processing at a very high speed and without the addition of any special circuit.

The second object of the present invention is to provide a picture signal interpolator which is capable of interpolation processing with a comparatively small amount of calculations.

The first object mentioned above is accomplished in such a way that the conversion process of a picture signal is performed in block unit, not in frame unit, and that, in order to raise the speed of the process, besides the orthogonal transform matrix stated before, the products between this orthogonal transform matrix and matrices which realize the picture resolution conversion, the image manipulation processes such as expansion, compression and rotation, and various kinds of linear filtering are provided in a coefficient memory as new transform matrices, which are properly changed-over in accordance with the content of the conversion process thereby to perform an orthogonal transform or an inverse orthogonal transform.

In this manner, in the block coding apparatus which employs the orthogonal transform, the products between the inverse orthogonal matrix and the matrices for image manipulation and filtering processing are adopted as new inverse transform matrices, whereby the above processes can be realized very fast and easily. Further, in the communication of a motion picture, the values of orthogonal transform coefficients which are not transmitted are suppressed by the use of the filtering process, whereby the elimination of a block distortion harmful to picture quality and the enhancement of the transmission efficiency can be realized.

Next, the second object mentioned above is accomplished in such a way that an original picture signal is converted into two-dimensional frequency components by the use of the orthogonal transform matrix, whereupon they are converted into a spatial area again by the use of an interpolating matrix, whereby the amount of calculations of the interpolation process is curtailed. Further, the products between the orthogonal transform matrix and the interpolating matrix are provided in a transform constant memory as a new transform matrix, and they are properly changed-over in accordance with the position of a pixel to be interpolated or the kind of the interpolation, whereby a higher processing speed can be realized.

In this manner, the picture signal is once converted into two-dimensional spatial frequency components by the orthogonal transform, and they are subsequently converted into the spatial area again by the inverse orthogonal transform, whereby the interpolation process of a picture can be realized very flexibly and simply. Further, the products of the matrices for the orthogonal transform as well as the inverse orthogonal transform and any desired linear transform are calculated and written into the transform constant memory beforehand, and they are properly selected and used, whereby very fast and simple interpolating and filtering processes become possible. Further, in the communication of a picture employing the orthogonal transform, block averages are first transmitted, and differences from a curved surface obtained by interpolations from the averages are transmitted, whereby the transmitting period of time can be shortened. At this time, the above differences are the differences of orthogonal transform coefficients themselves, and they can be obtained very simply without requiring any complicated process.

DETAILED DESCRIPTION OF THE PREFERRED EMBODIMENTS

Now, embodiments of the present invention will be described with reference to the drawings.

EMBODIMENT 1

Figure 1:
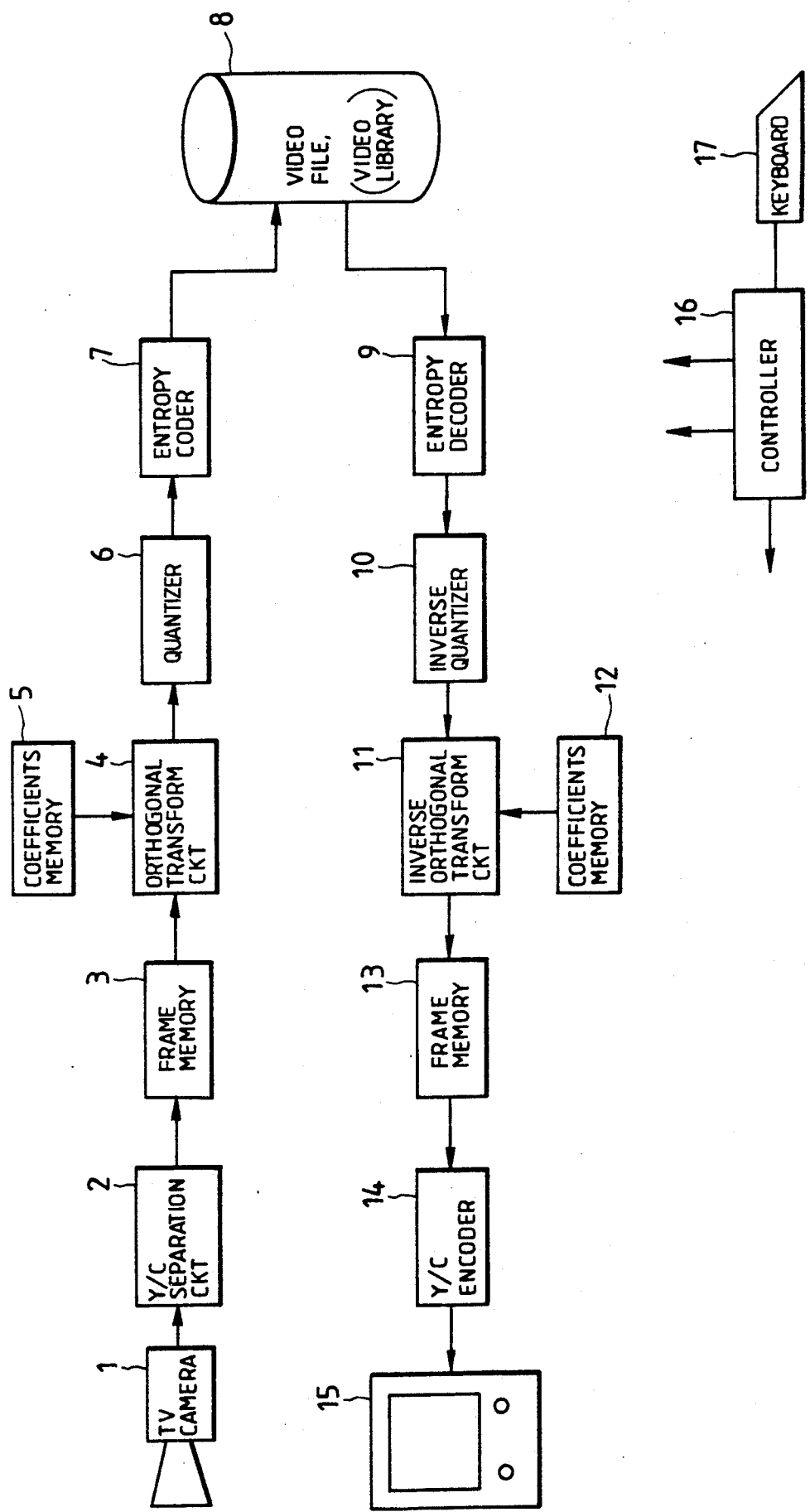
FIG. 1 is a diagram showing the arrangement of a filing apparatus for still pictures.

FIG. 1 is a block diagram showing the arrangement of a still picture filing apparatus which has image manipulation functions such as expansion, compression and rotation.

First, there will be explained the process of converting a picture signal in a transmitting or recording mode.

Figure 2:
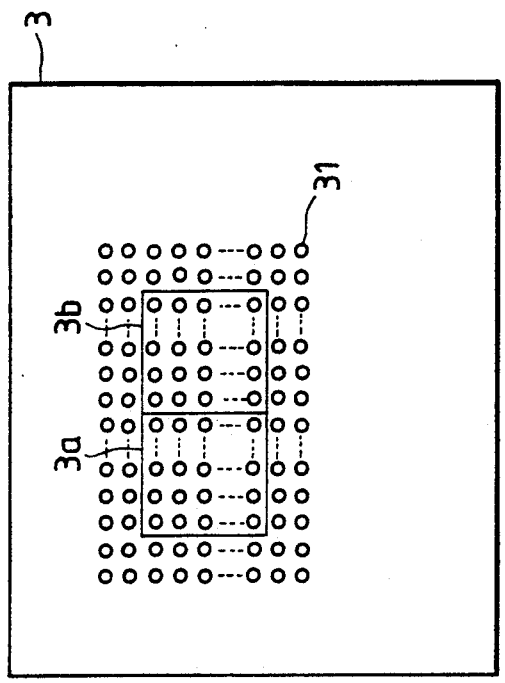
FIG. 2 is a conceptual diagram showing the positional relationship between the frame of a picture and blocks in the case of performing an orthogonal transform.

Referring to the figure, a picture signal taken by a television camera 1 is spatially sampled and is thereafter separated by a Y/C separation circuit 2 into a luminance signal (Y) and color-difference signals (C1, C2), which are respectively written into a frame memory 3. The contents of this frame memory are read by blocks, e.g., 3a or 3b in which pixels 31 are put together as illustrated in FIG. 2, and they are converted by an orthogonal transform circuit 4 into coefficients which correspond to frequency components. On this occasion, the values of a coefficient matrix (for example, DCT) to be used for the conversion are fetched from a coefficient memory 5. The coefficients after the conversion are quantized by a quantizer 6, and the quantized coefficients are transferred to an entropy coder 7 and are coded into signals with redundancy removed, which are recorded in a video file 8.

Here will be described the content of the conversion which is performed by the orthogonal transform circuit 4.

When the divided parts of the picture signal are now expressed by, for example, a matrix of 8×8 elements; D(8, 8), the following formula holds:

$$C = T \cdot D \cdot T^{-1}$$

Here, T ($T^{-1}$) denotes an orthogonal transform matrix, which becomes the following equation (1) in the case of the DCT:

$$T_{ij} = \tfrac{1}{2}[K_i \cos\{i(j+\tfrac{1}{2})\pi/8\}] \quad (i, j = 0, 7) \qquad (1)$$

where
$K_i = 1/\sqrt{2}$ for $i = 0$, and
$K_i = 1$ for $i \neq 0$.

As the result of the conversion, the coefficient matrix C(i, j) corresponding to the frequency components within the block is generated. Here, C(0, 0) is a D.C. coefficient corresponding to the average value of the block, and the coefficients are of higher spatial frequencies as i and j enlarge more.

In general pictures, significant coefficients concentrate on coefficients of comparatively low orders, so that the removal of redundancy is permitted by the assignments of quantization and variable-length coding utilizing this property.

On the other hand, in a reproducing mode, the variable-length codes read out of the video file 8 are decoded by an entropy decoder 9 into the orthogonal transform coefficients, which are passed via an inverse quantizer 10 and then inverse-transformed into the original picture signal every block by an inverse orthogonal transform circuit 11. On this occasion, a coefficient matrix to be used for the inverse transform is fetched from a coefficient memory 12. The reproduced picture signal is passed via a frame memory 13 and has a luminance signal and color-difference signals composed by an encoder 14, whereupon the resulting picture is displayed on a monitor television set 15.

The above circuit arrangement is controlled by a controller 16 in accordance with the contents of commands given from a keyboard 17.

Here will be described the content of the conversion which is performed by the inverse orthogonal transform circuit 11.

In an ordinary case where any image manipulation function is not used, the picture within the block is subjected to the following transform:

$$D = T^{-1} \cdot C \cdot T \qquad (2)$$

Here, the values of the DCT matrices T and $T^{-1}$ are fetched from the coefficient memory 12.

On the other hand, in a case where the picture within the block is processed by any image manipulation function, the following transform is carried out:

$$D = (L \cdot T^{-1}) \cdot C \cdot (T \cdot R) \qquad (3)$$

Here, L and R denote matrices each having 8×8 elements, and the products between each of them and the corresponding one of T and $T^{-1}$ become a matrix in the same form. Also the values of the two transform matrices (L·$T^{-1}$) and (T·R) are fetched from the coefficient memory 12 in accordance with signals from the controller 16, and the processes of the image manipulation and the inverse transform are simultaneously performed by the inverse orthogonal transform circuit 11.

The contents of the matrices L and R can be expressed depending upon the kinds of the image manipulation, as indicated below by way of example:

(1) Case of Horizontal Inversion $L = E\,0,\ R = E\,90$ where $E\,0$; unit matrix, and $$E90 = \begin{bmatrix} 0 & 0 & 0 & 0 & 0 & 0 & 0 & 1 \\ 0 & 0 & 0 & 0 & 0 & 0 & 1 & 0 \\ 0 & 0 & 0 & 0 & 0 & 1 & 0 & 0 \\ 0 & 0 & 0 & 0 & 1 & 0 & 0 & 0 \\ 0 & 0 & 0 & 1 & 0 & 0 & 0 & 0 \\ 0 & 0 & 1 & 0 & 0 & 0 & 0 & 0 \\ 0 & 1 & 0 & 0 & 0 & 0 & 0 & 0 \\ 1 & 0 & 0 & 0 & 0 & 0 & 0 & 0 \end{bmatrix}$$

(2) Case of Vertical Inversion $L = E\,90,\ R = E\,0$ (3) Case of 90° Right Turn $C \rightarrow {}^t C$ (transposition), and $L = E\,0,\ R = E\,90$ (4) Case of 90° Left Turn:

$C \rightarrow {}^t C$ (transposition), and $L = E\,90,\ R = E\,0$ (5) Case of 180° Rotation $L = E\,90,\ R = E\,90$ (6) Case of Expansion (in Horizontal Direction)

$L = E\,0,\ R = MH$

For doubling a left half, $$MH = \begin{bmatrix} 1 & \frac{1}{2} & 0 & 0 & 0 & 0 & 0 & 0 \\ 0 & \frac{1}{2} & 1 & \frac{1}{2} & 0 & 0 & 0 & 0 \\ 0 & 0 & 0 & \frac{1}{2} & 1 & \frac{1}{2} & 0 & 0 \\ 0 & 0 & 0 & 0 & 0 & \frac{1}{2} & 1 & \frac{1}{2} \\ 0 & 0 & 0 & 0 & 0 & 0 & 0 & \frac{1}{2} \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \end{bmatrix}$$

(7) Case of Expansion (in Vertical Direction)

$L = MV,\ R = E\,0$

For doubling an upper half, $$MV = \begin{bmatrix} 1 & 0 & 0 & 0 & 0 & 0 & 0 & 0 \\ \frac{1}{2} & \frac{1}{2} & 0 & 0 & 0 & 0 & 0 & 0 \\ 0 & 1 & 0 & 0 & 0 & 0 & 0 & 0 \\ 0 & \frac{1}{2} & \frac{1}{2} & 0 & 0 & 0 & 0 & 0 \\ 0 & 0 & 1 & 0 & 0 & 0 & 0 & 0 \\ 0 & 0 & \frac{1}{2} & \frac{1}{2} & 0 & 0 & 0 & 0 \\ 0 & 0 & 0 & 1 & 0 & 0 & 0 & 0 \\ 0 & 0 & 0 & \frac{1}{2} & \frac{1}{2} & 0 & 0 & 0 \end{bmatrix}$$

(8) Case of Compression

When an expansion matrix consisting of the coefficient matrices $C\,11$, $C\,12$, $C\,21$ and $C\,22$ of four adjacent blocks:

$$C = \begin{bmatrix} C11 & C12 \\ C21 & C22 \end{bmatrix}$$

is compressed to $\frac{1}{2}$, $$\begin{bmatrix} D11 & D12 \\ D21 & D22 \end{bmatrix} = \begin{bmatrix} T^{-1} & 0 \\ 0 & T^{-1} \end{bmatrix} \begin{bmatrix} C11 & C12 \\ C21 & C22 \end{bmatrix} \begin{bmatrix} T & 0 \\ 0 & T \end{bmatrix}$$

where the calculations of even-numbered (odd-numbered) rows and columns are not executed.

(9) Case of Low Pass Filtering (LPF)

$L = KL,\ R = KR$ where $$KL = \begin{bmatrix} 1-a & a & 0 & 0 & 0 & 0 & 0 & 0 \\ a & 1-2a & a & 0 & 0 & 0 & 0 & 0 \\ 0 & a & 1-2a & a & 0 & 0 & 0 & 0 \\ 0 & 0 & a & 1-2a & a & 0 & 0 & 0 \\ 0 & 0 & 0 & a & 1-2a & a & 0 & 0 \\ 0 & 0 & 0 & 0 & a & 1-2a & a & 0 \\ 0 & 0 & 0 & 0 & 0 & a & 1-2a & a \\ 0 & 0 & 0 & 0 & 0 & 0 & a & 1-a \end{bmatrix}$$

$$KR = \begin{bmatrix} 1-b & b & 0 & 0 & 0 & 0 & 0 & 0 \\ b & 1-2b & b & 0 & 0 & 0 & 0 & 0 \\ 0 & b & 1-2b & b & 0 & 0 & 0 & 0 \\ 0 & 0 & b & 1-2b & b & 0 & 0 & 0 \\ 0 & 0 & 0 & b & 1-2b & b & 0 & 0 \\ 0 & 0 & 0 & 0 & b & 1-2b & b & 0 \\ 0 & 0 & 0 & 0 & 0 & b & 1-2b & b \\ 0 & 0 & 0 & 0 & 0 & 0 & b & 1-b \end{bmatrix}$$

Here, any desired low-pass characteristics can be bestowed by changing the values a and b (subject to $0 \leq a$, $b \leq 0.5$).

Although, in the above, the various examples of the image manipulation and the filtering have been described, it is to be understood that similar effects are attained also for processes of still higher degree and complicated combinations thereof.

Besides, in the above description, the matrices L and R have been assumed ones of $8 \times 8$ elements which have the same form as that of the picture D or the transform coefficients C. It is possible, however, that the picture D to be extracted is expanded into, for example, $12 \times 12$ elements on the sending side, while the matrices L and R are respectively set at $8 \times 12$ elements and $12 \times 8$ elements. On this occasion, the following formula (4) holds:

$$C = T \cdot L \cdot D \cdot R \cdot T^{-1} \qquad (4)$$

In this manner, regarding any desired linear transform which is expressed by a matrix, the products between the matrix and an inverse orthogonal transform matrix are read out of a memory circuit, and they are multiplied from both the sides of the coefficient matrix, whereby the conversion of a picture and the inverse orthogonal transform can be simultaneously performed, and the operating period of time can be shortened to a half or less. Circuits required for the processing stated above are only the memory circuit for storing the matrices as mentioned above and some control circuits for changing-over the matrices in accordance with the kinds of the transforms, and they can be realized very simply. In addition, a system which rewrites the contents of the memory circuit adaptively by the use of a microprocessor can be readily realized.

EMBODIMENT 2

Figure 3:
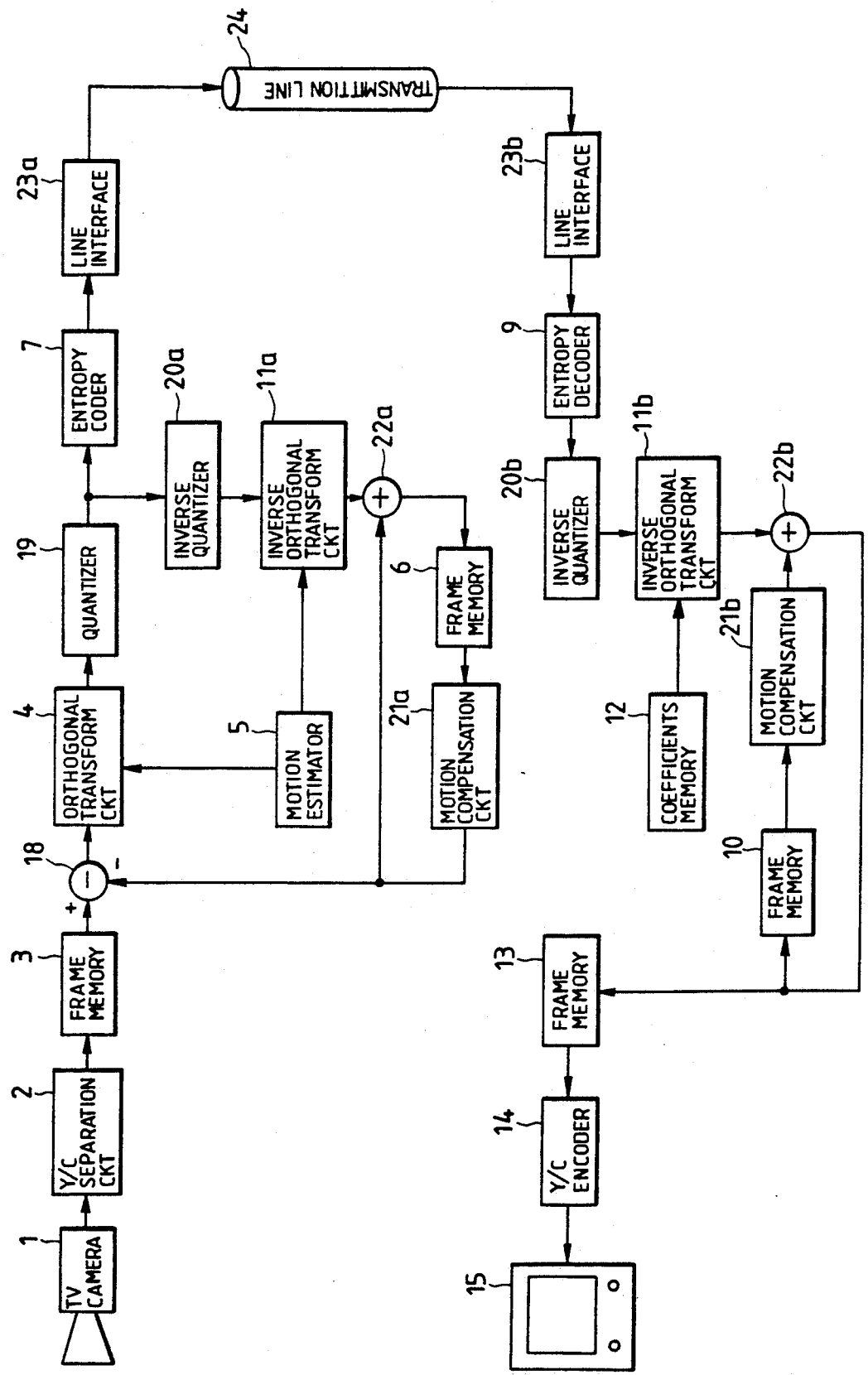
FIG. 3 is a diagram showing the arrangement of a motion picture transmitting apparatus.

Next, the second embodiment of the present invention will be described with reference to FIG. 3 and FIGS. 4A–4C. FIG. 3 is a block diagram showing the arrangement of a motion-compensated interframe coding equipment of low bit rate. As in the first embodiment, the output of a television camera 1 is separated by a Y/C separation circuit 2 into luminance and color-difference signals, which are respectively written into a frame memory 3. The picture signal is divided into blocks each having $8 \times 8$ pixels, and the difference thereof from the signal of a transmitted frame is input to an orthogonal transform circuit 4 by a subtracter 18. On this occasion, the motion vector between the frames is measured so that the difference may become a smaller value (motion-compensated interframe prediction).

In the orthogonal transform circuit 4, the products between a transform matrix and a matrix having low-pass characteristics are read out of a motion estimator or coefficient memory 5 as stated in the first embodiment. The low-pass characteristics are adaptively controlled in accordance with the number of transmission frames. The coefficients after the conversion are passed through a quantizer 19 and have redundancy removed by an entropy coder 7, and the resulting codes are delivered to a transmission line 24 via a line interface 23a.

In addition, the output of the quantizer 19 is decoded into an interframe difference signal by an inverse quantizer 20a as well as an inverse orthogonal transform circuit 11a, the difference signal is added with a motion vector-compensated transmitted frame signal by an adder 22a, and the resulting signal is written into a frame memory 6 as a new frame signal. Via a motion compensation circuit 21a, the output of the frame memory 6 becomes a reference picture which is compared with a frame signal to be subsequently transmitted.

On the other hand, the signal of the transmission line 24 is decoded into an orthogonal transform coefficient by a line interface 23b as well as an entropy decoder 9, and the coefficient is transformed into an interframe difference signal by an inverse quantizer 20b as well as an inverse orthogonal transform circuit 11b. As in the case of the sending side, this interframe difference signal is added with a motion vector-compensated transmitted frame signal by an adder 22b, and the resulting signal is written into frame memories 10 and 13 as a new frame signal. This signal is passed through a Y/C encoder 14, and is displayed on a monitor TV set 15.

On this occasion, the various circuits including a motion compensation circuit 21b are controlled so that the contents of the frame memory 10 may agree with those of the frame memory 6 on the sending side.

Incidentally, in case of an inverse orthogonal transform, both the sending and receiving sides employ an ordinary inverse transform matrix in consideration of the compatibility (but it is also possible to execute various kinds of image manipulation processes and filtering processes described in the first embodiment).

Figure 4C:
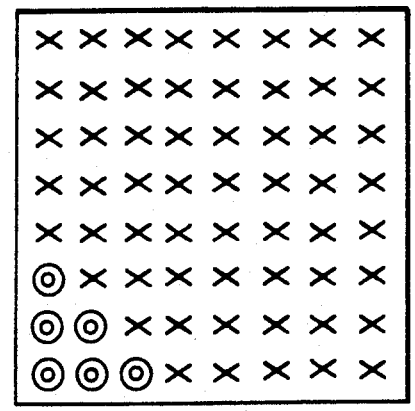
FIGS. 4A–4C are diagrams showing the relationship between the orthogonal transform coefficients and filtering process of a motion picture coding apparatus.
Figure 4B:
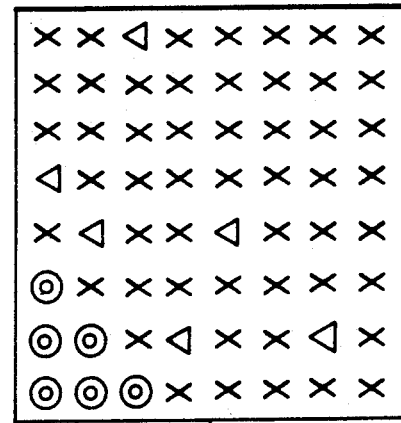
Figure 4A:
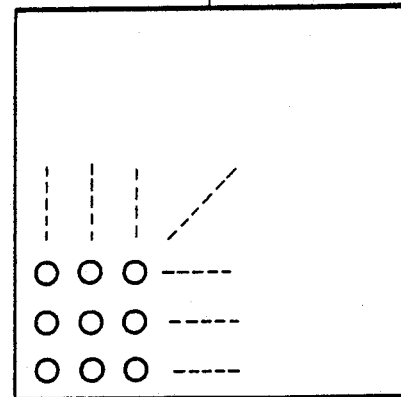

Next, a process eliminating a block distortion will be described with reference to FIGS. 4A–4C.

In general, when all coefficients subjected to the orthogonal transform are transmitted, the block distortion hardly poses a problem. It is sometimes the case, however, that significant coefficients of comparatively high orders fail to be transmitted due to the security of the number of transmission frames. By way of example, when pixel signals shown in FIG. 4A are subjected to the orthogonal transform, the transformed coefficients become as shown in FIG. 4B. Here, marks ⊙ denote significant coefficients which are transmitted, marks x denote insignificant coefficients which are not transmitted, and marks Δ denote coefficients which are significant but which cannot be transmitted. On the receiving side, the values of the untransmitted coefficients are decoded as zero at this time, so that a level difference arises between blocks under the influence of the coefficients indicated by the marks Δ and appears as an obstacle in the picture quality.

In the present invention, in order to prevent such degradations in the picture quality, when the number of transmission frames is secured, the orthogonal transform is performed in the way that the products between the orthogonal transform matrix and the matrix having the low-pass characteristics are fetched from the coefficient memory 5. Since the comparatively high frequency components of the picture are removed by the low-pass filtering, the values of the untransmitted coefficients become small as illustrated in FIG. 4C.

As a result, the picture quality degradations ascribable to the block distortion can be eliminated or relieved very effectively. It is also possible to control the number of transmission frames in such a way that the filtering characteristics are adaptively controlled in accordance with the picture to-be-transmitted.

Since the above filtering process is performed simultaneously with the orthogonal transform, it is very fast. It can be readily realized merely by increasing the area of the coefficient memory.

Moreover, coefficients which are hardly problematic in the picture quality even when not transmitted are uniquely determined by the filtering characteristics. By coding the characteristics and transmitting the codes, therefore, the transmission of the invalid coefficients can be omitted, and the enhancement of the transmission efficiency can be achieved.

In this embodiment, the multiplier-accumulator circuits are employed for the operations. However, in a case where the processing period of time has some margin, signal processors can also be utilized.

EMBODIMENT 3

Now, the third embodiment of the present invention will be described with reference to FIG. 5.

Figure 5:
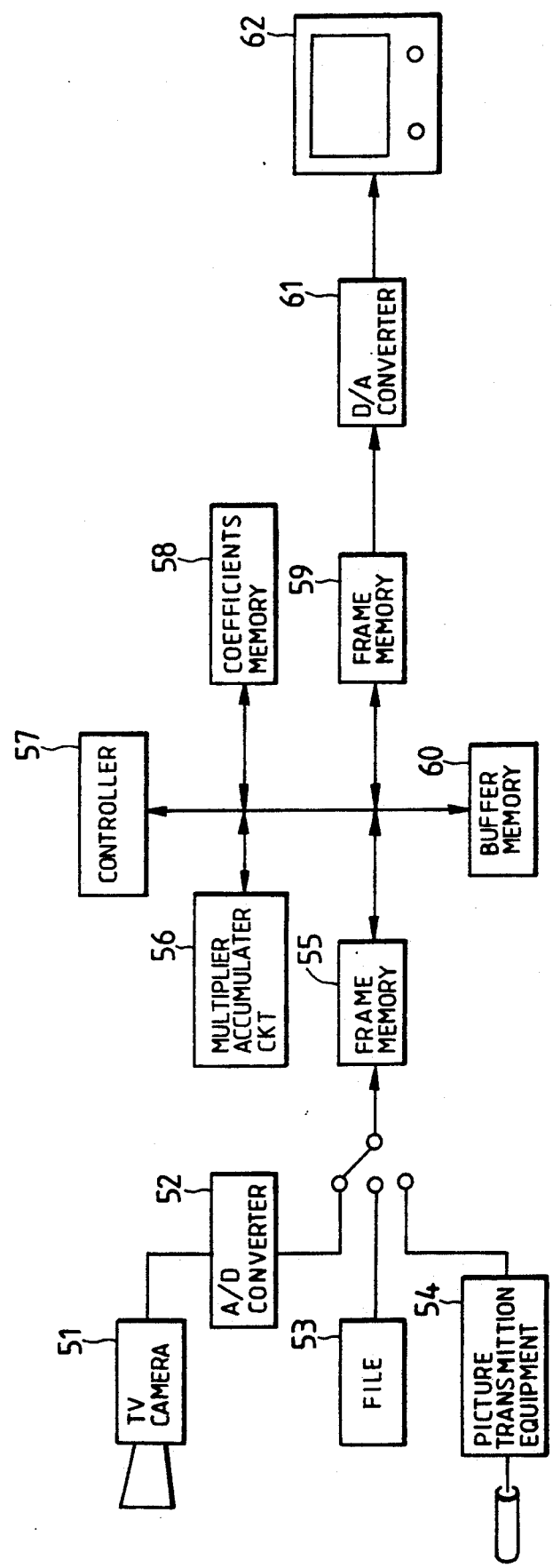
FIG. 5 is a diagram showing an embodiment of a picture interpolation circuit according to the present invention.

FIG. 5 is a block diagram of a circuit arrangement which converts an original picture of m×n pixels into an interpolated picture of M×N pixels.

Referring to the figure, a digital picture signal which has been accepted from a television camera 51 and an A/D converter 52, from a still picture file 53 or from a still picture transmission equipment 54 is once written into a frame memory 55. Signals of m×n pixels; V(i, j) (i=1, 2, ... m) (j=1, 2, ... n) are read out of the frame memory 55, and they are subjected by a multiplier-accumulator circuit 56 to multiplying accumulation operations with signals read out of a coefficient or transform constant memory 58, thereby to be transformed into coefficients corresponding to frequency components; C(i, j) (i=1, 2, ... m) (j=1, 2, ... n). This transform is a linear transform, and is expressed as follows by the use of transform matrices D1(i, j) (i, j=1, 2, ... n) and D2(i, j) (i, j=1, 2, ... m):

$$C = D1 \cdot Y \cdot D2 \qquad (5)$$

Although transform matrices include those of KL transform, Hadamard transform, etc., DCT (Discrete Cosine Transform) of comparatively easy operations and excellent characteristics is used. In case of the DCT, the matrices D1 and D2 become as follows:

$$D1(i, j) = \sqrt{2/n} \, [K_j \cdot \cos\{(i - \tfrac{1}{2})(j - 1)\pi/n\}] \qquad (6)$$

$$(i, j = 1, 2, \ldots n)$$

$$D2(j, i) = \sqrt{2/m} \, [K_j \cdot \cos\{(i - \tfrac{1}{2})(j - 1)\pi/m\}] \qquad (7)$$

$$(i, j = 1, 2, \ldots m)$$

where
$K_j = 1/\sqrt{2}$ for j=1, and
$K_j = 1$ for j≠1

The matrices D1 and D2 are normalized orthogonal transform matrices (unitary matrices), and the products thereof form a unit matrix at m=n.

The coefficients transformed by the multiplier-accumulator circuit 56; C(i, j) (i=1, 2, ... m) (j=1, 2, ... n) are components which correspond to a kind of spatial frequencies. C(1, 1), for example, is a D.C. coefficient corresponding to the average value of a block, and the coefficients are of higher spatial frequencies as i and j enlarge more. These coefficients are once stored in a buffer memory 60.

Subsequently, matrices for an interpolation process are read out of the coefficient memory 58, and the multiplications thereof with the above transform coefficients are executed by the multiplier-accumulator circuit 56, whereby an interpolated picture F is generated. This interpolated picture F is written into a frame memory 59, and is displayed on a monitor (display unit) 62 via a D/A converter 1. These circuits are controlled by a controller 57.

Here, the following formula (8) holds for the transform stated above:

$$F = H1 \cdot C \cdot H2 \qquad (8)$$

In addition, H1 and H2 become as follows:

$$H1(j, i) = \sqrt{2/n} \, [K_j \cdot \cos\{(i - \tfrac{1}{2})(j - 1)\pi/N\}] \qquad (9)$$

$$(i = 1, 2, \ldots N)(j = 1, 2, \ldots n)$$

$$H2(i, j) = \sqrt{2/m} \, [K_j \cdot \cos\{(i - \tfrac{1}{2})(j - 1)\pi/M\}] \qquad (10)$$

$$(i = 1, 2, \ldots N)(j = 1, 2, \ldots m)$$

where
$K_j = 1/\sqrt{2}$ for j=1, and
$K_j = 1$ for j≠1

Owing to the above operations, the original picture of m×n pixels is converted into the interpolated picture of M×N pixels by the DCT matrices D1, D2 and the interpolation matrices H1, H2.

Although, in the above, the process for obtaining the orthogonal transform coefficients and the process for generating the interpolated picture on the basis of these coefficients have been described as two separate stages, they are realized by a single process in this embodiment. Next, the details of the single process will be explained.

When Eq. (5) is substituted into Eq. (6), the following formula is obtained:

$$F = H1 \cdot D1 \cdot Y \cdot D2 \, H2 = (H1 \cdot D1) \cdot Y \cdot (D2 \, H2) \qquad (11)$$

Here, (H1·D1) and (D2·H2) denote matrices of (n×N) and (M×m), respectively, and they can be uniquely obtained beforehand irrespective of the contents of the original picture when the positional relations between the original picture and pixels to be interpolated are determined.

Accordingly, the contents of these matrices are previously written into the coefficient memory 58, whereby the interpolation process can be realized by very fast and simple operations.

By the way, in a case where no interpolation is performed (M=m, N=n), the matrices (H1·D1) and (D2·H2) become the unit matrices of (n×n) and (m×m), respectively, and the original picture Y is reproduced as it is.

There will be explained the relationship between the orthogonal transform coefficients and the picture in the above interpolation process.

When the transform coefficients of Eq. (5) are brought into correspondence with original picture areas, they are expressed as cosine curved surfaces corresponding to the orders thereof. For example, the coefficient C(2, 1) becomes a curved surface which varies in a horizontal direction at a half of the cosine cycle. This curved surface is continuous, and the values of any desired points lying thereon are significant for the interpolated picture.

Accordingly, although i and j have been defined as integers in Eq. (9), they need not always be the integers. In a case where interpolation points are at unequal intervals, any desired real numbers can also be employed.

Further, besides the interpolation process stated above, the filing process etc. of the picture can be simultaneously realized.

By way of example, any desired matrices W and W' are multiplied from both the sides of the original picture Y or the interpolation picture F, whereby low-pass and other filtering processes can be realized. More specifically, instead of the matrices (H1·D1) and (D2·H2) in Eq. (11), matrices (W·H1·D1) and (D2·H2·W), (H1·D1·W) and (W·D2·H2), or (H1·W·D1) and (D2·W·H2) are written into the coefficient memory 58 beforehand, and the multiplications thereof with the original picture Y are executed, whereby the speed of the operations can be readily raised.

In addition, transform constants are sometimes arranged very regularly in these matrices, and a high-speed operating method called "FFT" is also applicable.

Although, in the above, the several examples of the interpolation and filtering of pictures have been described, it is to be understood that similar effects are attained also for processes of still higher degree and complicated combinations thereof.

Circuits required for such processes are only the memory circuit for storing the matrices stated above and some control circuits for changing-over the matrices in accordance with the kinds of the transforms, and they can be realized very simply.

Further, it has been described above that the picture signals accepted from the television camera, the still picture file and the still picture transmission equipment are handled. In this regard, in the transmission equipment for the still picture or a transmission equipment for a motion picture, the picture is divided into blocks, the transform such as DCT is performed every block, and the transformed coefficients are entropy-coded and then transmitted. Accordingly, in a case where the coefficients are inverse-transformed on the receiving side, circuits therefor and arithmetic circuits indicated by Eq. (8) of this embodiment can also be shared.

Besides, the interpolation process described in this embodiment can also be realized using digital signal processors which have multiplying accumulation operation functions of very high speed.

Further, using these processors, a system in which the contents of the memory circuit are adaptively rewritten can be realized with ease.

In this manner, the conversion of a picture and the inverse orthogonal transform can be simultaneously performed, and the operating period of time can be shortened to a half or less.

EMBODIMENT 4

Next, the fourth embodiment of the present invention will be described with reference to FIG. 6.

The third embodiment has been described as to the method of obtaining the interpolated picture of the M×N pixels interpolated from the original picture of the m×n pixels. However, when the interpolation process is performed using the average of, for example, m×n blocks left intact, the average values of the individual blocks are not always ensured.

In this embodiment, therefore, an interpolation method in which the D.C. values (average values) of a picture divided into blocks are kept will be concretely described.

Figure 6:
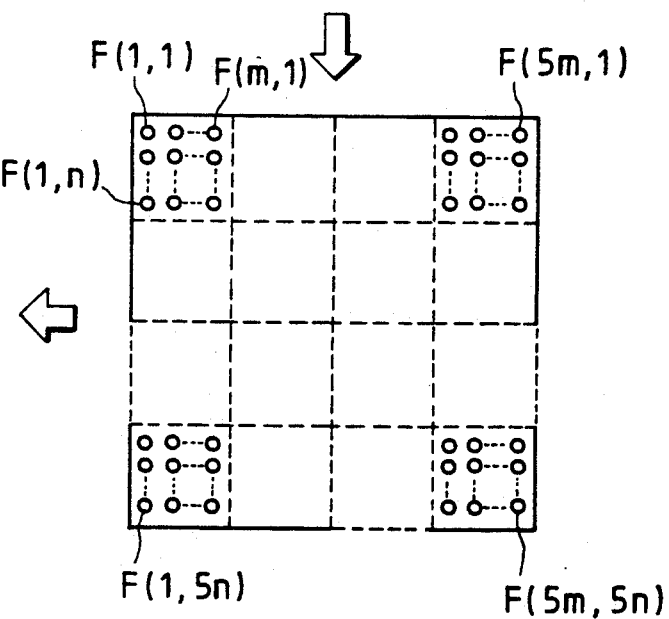
FIG. 6 is a conceptual diagram showing the relationship between the D.C. values and interpolated pictures of a picture divided into blocks.

FIG. 6 illustrates an example of interpolation which employs the average values of a block to be subjected to an interpolation process and the surrounding 24 blocks.

Now, when an original picture Y(5, 5) consisting of 5×5 blocks is subjected to the orthogonal transform by the method DCT stated in the third embodiment, 5×5 transform coefficients C(5, 5) can be found, and an interpolated picture F(M, N) can be obtained from the coefficients by the use of Eq. (8).

Assuming here that each of the blocks is configured of m×n pixels, the following holds:

$$F = H1 \cdot C \cdot H2$$

$$M = 1, 2, \ldots 5m, N = 1, 2, \ldots 5n$$

where H1 and H2 denote the respective matrices stipulated by Eq. (9) and Eq. (10).

That is, the interpolated picture F(M, N) can be expressed using the 25 unknown transform variables C(i, j) (i=1, 2, ... 5) (j=1, 2, ... 5).

Accordingly, letting A(i, j) (i=1, 2, ... 5) (j=1, 2, ... 5) denote the averages of the respective blocks, the following formula holds:

$$A(i, j) = \sum_{k, l} F(i + k, j + l) \tag{12}$$

Thus, 25 linear equations whose number is equal to that of the unknown variables are generated, and the aforementioned transform coefficients C(i, j) can be evaluated by solving the simultaneous equations.

That is, the following equations hold:

$$a = W \cdot c \tag{13}$$

$$c = W \cdot a \tag{14}$$

Here, c and a denote vectors of 25 terms into which the respective matrices C and A of 5×5 elements are rearrayed to be unidimensional. Since the matrix W does not depend upon the original picture, it is computed beforehand and is written into the transform constant memory 58, whereby the interpolation process can be realized using a method similar to that of the third embodiment.

That is, the matrix C is determined from the vector c, and the interpolated picture F(M, N) in which the block averages are kept can be obtained using Eq. (8).

Although, in the above description, the original picture Y(5, 5) composed of the 5×5 blocks has been referred to, it is to be understood that the original picture can be expanded to any desired number of blocks.

Further, likewise to the third embodiment, any of low-pass and other filtering processes can be simultaneously realized.

Besides, regarding the motion picture or still picture transmission equipment wherein the orthogonal transform such as DCT is performed every block, differences from the interpolation pixels F(M, N) as evaluated from the D.C. values are transmitted, whereby the transmission period of time can be shortened. The reason is that, in the periphery of the block, deviations from the average value become large. More specifically, when the parts to be transmitted in the interpolated picture:

$$F'(K, L) \ (K=1, 2, \ldots m) \ (L=1, 2, \ldots n)$$

are extracted and are subjected to the orthogonal transform by the use of Eq. (5), the following formula holds:

$$\begin{aligned} C' &= D1 \cdot F \cdot D2 \\ &= (D1 \cdot H1) \cdot C \cdot (H2 \cdot D2) \end{aligned} \quad (15)$$

Here, differences from interpolated pixels F'(M, N) as obtained from the D.C. values are expressed as differences also in the area of orthogonal transform coefficients C'. Accordingly, the method of transmitting the differences between the coefficients C' and the coefficients obtained by the orthogonal transforms of the blocks of the original picture is effective for enhancing the transmission efficiency. In addition, as in the foregoing, it is possible to apply the method wherein the values of the matrices (D1·H1) and (H2·D2) are computed beforehand, and they are fetched from the transform constant memory 58. Incidentally, as to the aforementioned transmission efficiency, an improvement of about 8% has been expected by a simulation.

Processes conforming to the contents of the above interpolation and filtering processes can be realized through quite similar controls merely by increasing the area of the transform constant memory, so that the method of the embodiment is very flexible.

In this embodiment, the multiplier-accumulator circuits are employed for the operations. However, in a case where the processing period of time has some margin, signal processors can also be utilized.

What is claimed is:

1. A picture signal processor comprising:
   memory means for storing a picture signal;
   a first source of at least one matrix indicative of a product of an orthogonal-transform matrix and at least one of an image manipulation matrix and a filter matrix;
   means, responsive to the first source, for reading out eh picture signal from the memory means on a block-by-block basis and converting the picture signal into coefficients corresponding to frequency components;
   means for quantizing the converted coefficients;
   means for coding the quantized coefficients into signals with redundancy removed and storing the coded signals in a video file;
   means for decoding variable-length codes read out from the video file into orthogonal transform coefficients;
   means for inverse-quantizing the orthogonal transform coefficients;
   a second source of at least one matrix indicative of a product of an orthogonal-transform matrix and at least one of an image manipulation matrix and a filter matrix; and
   means, responsive to the second source, for inverse-transforming the inverse-quantized coefficients into the picture signal on a block-by-block basis.

2. A motion-compensated interframe coding apparatus comprising:
   memory means for storing a first picture signal;
   means for deriving a first difference signal by subtracting a reference signal from the first picture signal
   a first source of at least one matrix indicative of a product of an orthogonal-transform matrix and at least one of an image manipulation matrix and a filter matrix;
   means, responsive to the first source, for converting the first difference signal into coefficients corresponding to frequency components;
   means for quantizing the converted coefficients;
   first inverse-quantizing means for inverse-quantizing the quantized coefficients;
   first means, responsive to the first source, for inverse-transforming the inverse-quantized coefficients;
   first motion compensation means for compensating the inverse-transformed coefficients with a motion of picture signal and thereby making the reference signal;
   means for coding the quantized coefficients into signals with redundancy removed which are adopted to be transmitted through a transmission means;
   means for decoding variable-length codes, read out from the transmission means, into orthogonal transform coefficients;
   second inverse quantizing means for inverse-quantizing the orthogonal transform coefficients;
   a second source of at least one matrix indicative of a product of an orthogonal-transform matrix and at least one of an image manipulation matrix and a filter matrix;
   second means, responsive to the second source, for inverse-transforming the inverse-quantized coefficients into a second difference signal on a block-by-block basis; and
   second motion compensation means for compensating the second difference signal with a second motion of picture signal, thereby producing a second picture signal.

3. A circuit for converting an original picture into an interpolated picture, comprising:
   frame memory means for storing an original picture signal;
   coefficient memory means for storing orthogonal matrices for an interpolation process;

means for reading out the original picture signal from the frame memory means on a block-by-block basis;

means for converting each block of the original picture signal into coefficients corresponding to frequency components;

means for reading out the orthogonal matrices for an interpolation process from the coefficient memory means; and means for producing an interpolation picture by multiplying the orthogonal matrices by the coefficients.

4. An apparatus for reproducing a picture signal from an output of a video file comprising:

means for decoding variable-length codes read out from the video file into orthogonal transform coefficients;

means for inverse quantizing the orthogonal transform coefficients;

a first source of at least one matrix indicative of a product of an orthogonal-transform matrix and at least one of an image manipulation matrix and a filtering matrix; and means, responsive to the first source, for inverse-transforming the inverse-quantized coefficients into the picture signal on a block-by-block basis.

5. An apparatus for reproducing a picture signal from an output of a transmission system comprising:

means for decoding variable length codes, read out from the transmission system, into orthogonal transform coefficients;

means for inverse quantizing the orthogonal transform coefficients;

a first source of at least one matrix indicative of a product of an orthogonal-transform matrix and at least one of an image manipulation matrix and a filtering matrix;

means, responsive to the first source, for inverse-transforming the inverse-quantized coefficients into a different signal on a block-by-block basis; and motion compensation means for compensating the difference signal with a motion of picture signal, thereby reproducing an picture signal.

6. A method of processing a picture signal comprising the steps of:

storing a picture signal;

reading the stored picture signal on a block-by-block basis and converting the picture signal into coefficients corresponding to frequency components utilizing a matrix which is indicative of a product of an orthogonal-transform matrix and at least one of an image manipulation matrix and a filtering matrix;

quantizing the converted coefficients;

coding the quantized coefficients into signals with the redundancy removed and storing the coded signals in a video file;

decoding variable-length codes read out from the video file into orthogonal transform coefficients;

inverse-quantizing the orthogonal transform coefficients; and inverse-transforming the inverse-quantized coefficients into the picture signal on a block-by-block basis utilizing at least one additional matrix indicative of a product of an orthogonal-transform matrix and at least one of an image manipulation matrix and a filtering matrix.

* * * * *